(12) United States Patent
Wu

(10) Patent No.: US 12,728,794 B2
(45) Date of Patent: Sep. 8, 2026

(54) REARVIEW MIRROR OF VEHICLE

(71) Applicant: EVOAS TECHNOLOGY CO., LTD., Taichung City (TW)

(72) Inventor: Yun-Cheng Wu, Taichung City (TW)

(73) Assignee: EVOAS TECHNOLOGY CO. , LTD., Taichung City (TW)

( * ) Notice: Subject to any disclaimer, the term of this patent is extended or adjusted under 35 U.S.C. 154(b) by 235 days.

(21) Appl. No.: 18/764,490

(22) Filed: Jul. 5, 2024

(65) Prior Publication Data

US 2026/0008414 A1 Jan. 8, 2026

(51) Int. Cl.
*B60R 1/06* (2006.01)

(52) U.S. Cl.
CPC .................................... *B60R 1/06* (2013.01)

(58) Field of Classification Search
CPC ........................................................ B60R 1/06
See application file for complete search history.

(56) References Cited

U.S. PATENT DOCUMENTS 2,929,600 A * 3/1960 Malachowski ........... B60R 1/06 403/201
3,235,294 A * 2/1966 Naylor ...................... B60R 1/06 403/128
4,565,345 A * 1/1986 Templeman .......... F16C 11/106 403/90
2019/0126828 A1* 5/2019 Chen ......................... B60R 1/06

* cited by examiner

*Primary Examiner* — Edmond C Lau
(74) *Attorney, Agent, or Firm* — Demian K. Jackson; Jackson IPG PLLC

(57) ABSTRACT

A rearview mirror of a vehicle contains a holder, a rotatable connector, a mirror body, a screw, and a cap. The holder includes a fixing portion, an arcuate groove, and an internal threaded section. The rotatable connector includes a fitting portion and a universal joint, the fitting portion extends out of the arcuate groove and has a receiving orifice extending to the universal joint, and the universal joint has a defining orifice extending to the fitting portion and communicating with the receiving orifice. The mirror body includes a reflective mirror, a connection post, and a screwing orifice. The screw is inserted through the defining orifice to screw with the screwing orifice. The cap includes an abutting portion and an external threaded section. The external threaded section is screwed with the internal threaded section so that the universal joint is rotatably clamped between the arcuate groove and the abutting portion.

10 Claims, 8 Drawing Sheets

REARVIEW MIRROR OF VEHICLE

TECHNICAL FIELD

The present invention relates to a rearview mirror, and more particularly to the rearview mirror which is fixed on a handlebar of a vehicle.

BACKGROUND

Two-wheeled vehicles such as bicycles and motorcycles are very popular means of transportation among modern people. These vehicles are provided with a rearview mirror on the left and right sides of the handlebar for the driver to use when driving on the road, especially when changing lanes or turning, it can use the rearview mirror to observe the situation behind the driver, thus improving driving safety and reducing the incidence of accidents.

Because the driver of the vehicle may occasionally change, the rearview mirror is adjusted an angle according to the driver's different height and habits, or even if the driver does not change, the angle of the rearview mirror may change due to changes in the viewing angle.

To solve the problem mentioned above, a conventional rearview mirror has been developed as shown in FIGS. 7 and 8. The conventional rearview mirror contains a mirror body 80 and a holder 90, wherein the mirror body 80 includes a post 81 extending therefrom, and the post 81 has a spherically universal joint 82 formed on a distal end thereof, the holder 90 has a recess 91 defined on an end thereof, and the recess 91 has a first arcuate concavity 92 and is connected with a clamper 93, wherein the clamper 93 has a second arcuate concavity 94, and the spherically universal joint 82 is defined between the first arcuately concavity 92 and the second arcuately concavity 93, the holder 90 is locked with the clamer 94 by using a locking element 95 to fix the mirror body 80 in an angle, and an angle of the mirror body 80 is adjustable by rotating the locking element 95 loosely. However, some defects still exist in the conventional rearview mirror. For example, the post 81 is a one-piece molded with the mirror body 80, the difficulty of injection molding will increase to cause a high fabrication cost. The mirror body 80 is made of plastic, and the post 81 and the universal joint 82 are made of plastic as well causing poor structural strength, thus having easy fracture, poor durability, and short service life.

The present invention has arisen to mitigate and/or obviate the afore-described disadvantages.

SUMMARY

The primary aspect of the present invention is to provide a rearview mirror of a vehicle which contains a rotatable connector being an independent component, and a screw is screwed with a mirror body, such that the rotatable connector is injection molded easily and a fabrication cost of the rear mirror is quite low.

Another aspect of the present invention is to provide a rearview mirror of a vehicle which is capable of reinforcing a structure of the rotatable connector to avoid a fracture of the rotatable connector and to enhance durability and service life.

To obtain above-mentioned aspects, a rearview mirror of a vehicle provided by the present invention contains a holder, a rotatable connector, a mirror body, a screw, and a cap.

The holder includes a fixing portion connected to an end of the mirror body, an arcuate groove and an internal threaded section formed on and communicating with the other end of the holder.

The rotatable connector includes a fitting portion formed on an end of the rotatable connector, and a universal joint formed in a sphere shape on the other end of the rotatable connector. The universal joint is fitted on the arcuate groove, the fitting portion extends out of the arcuate groove and has a receiving orifice extending to the universal joint, and the universal joint has a defining orifice extending to the fitting portion and communicating with the receiving orifice.

The mirror body includes a reflective mirror formed on a front end thereof, a connection post received in a back end of the mirror body, and a screwing orifice defined in the connection post. The connection post is fitted with the receiving orifice of the rotatable connector.

The screw is inserted through the defining orifice of the rotatable connector to screw with the screwing orifice of the mirror body.

The cap includes an abutting portion formed on an end of the cap, and an external threaded section formed on an outer wall of the cap. The external threaded section is screwed with the internal threaded section of the holder so that the universal joint of the rotatable connector is rotatably clamped between the arcuate groove of the holder and the abutting portion of the cap.

DETAILED DESCRIPTION

Figure 1:
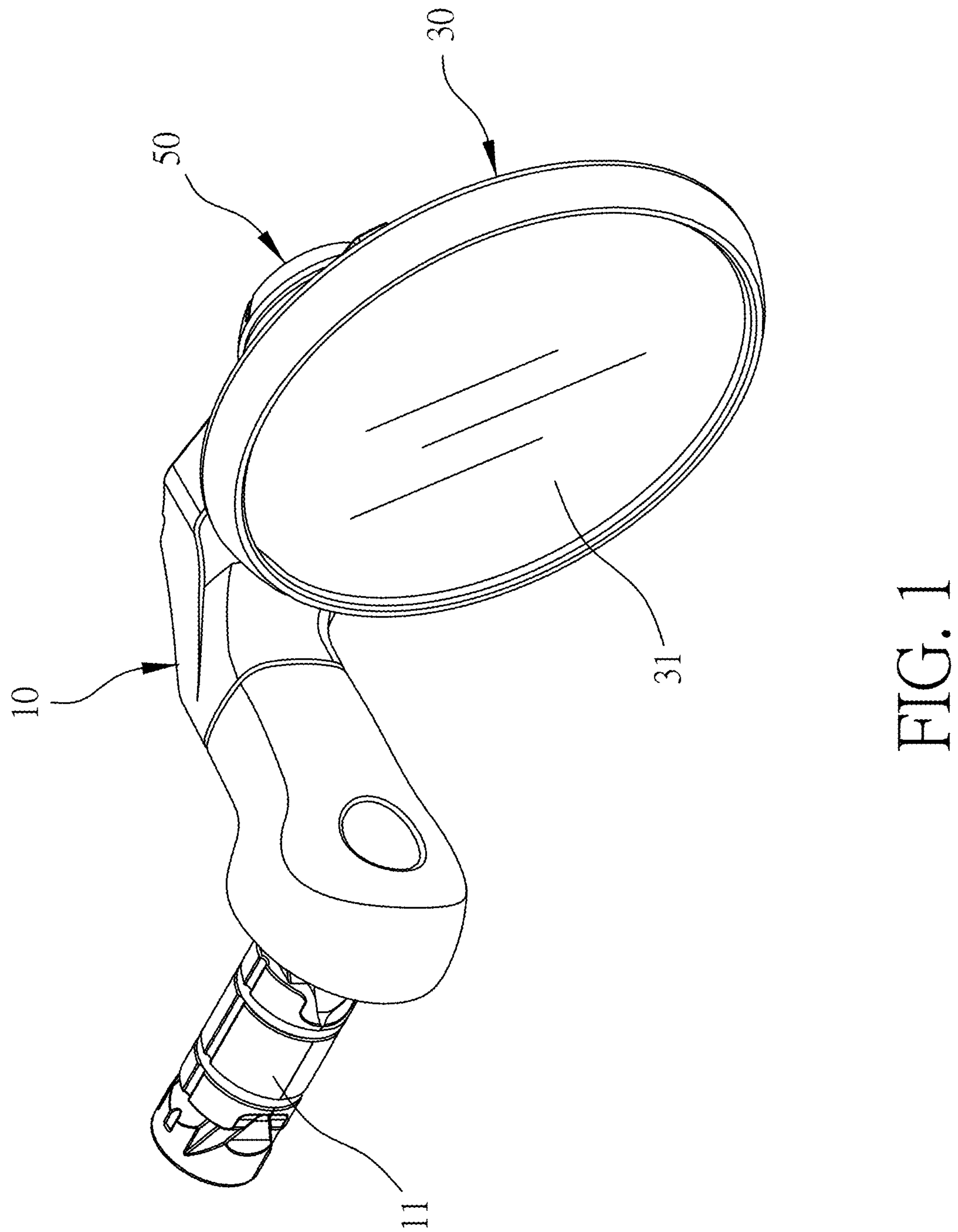
FIG. 1 is a perspective view showing the assembly of a rearview mirror of a vehicle according to a preferred embodiment of the present invention.
Figure 2:
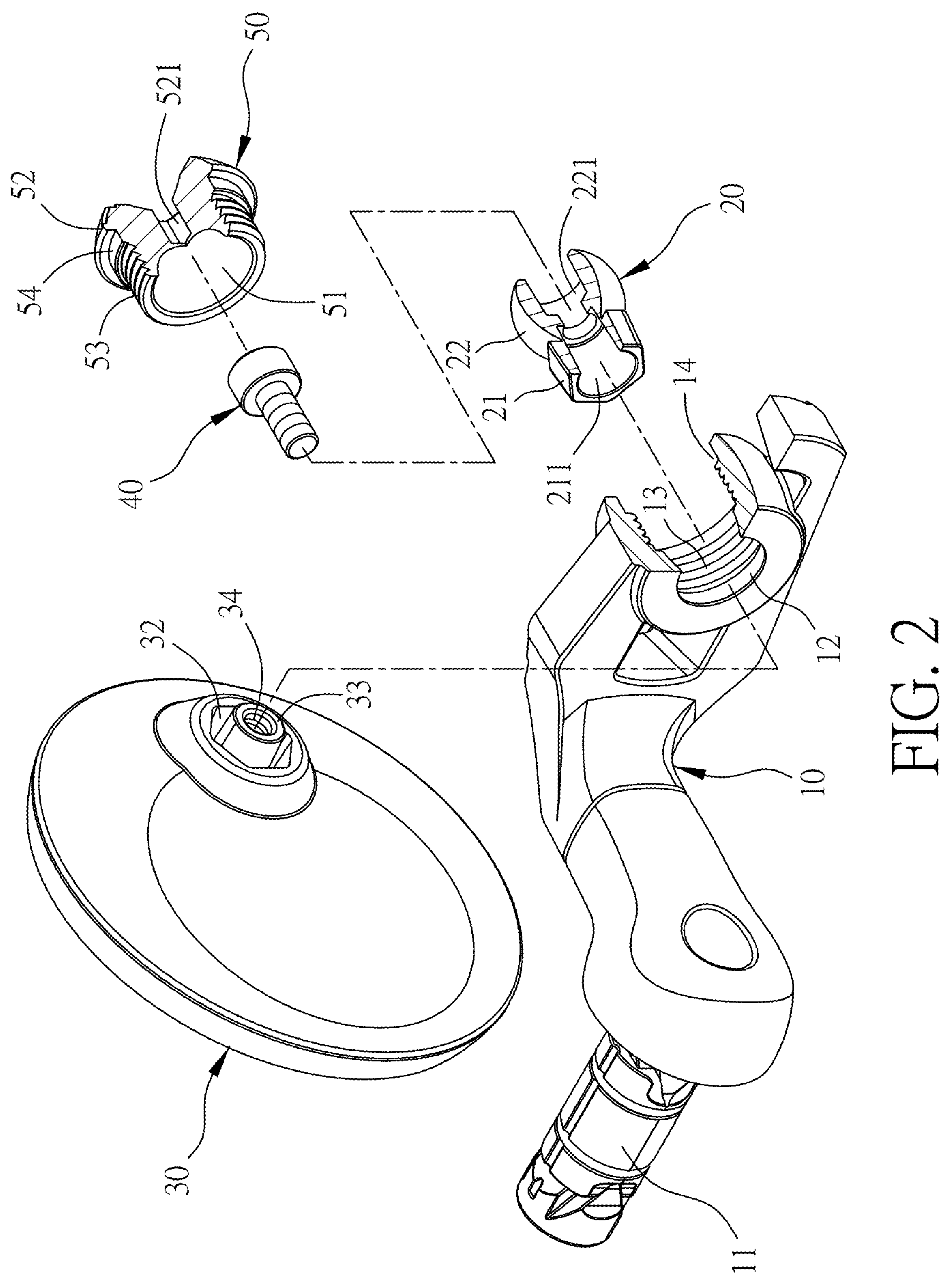
FIG. 2 is a perspective view showing the exploded components of the rearview mirror of the vehicle according to the preferred embodiment of the present invention.
Figure 3:
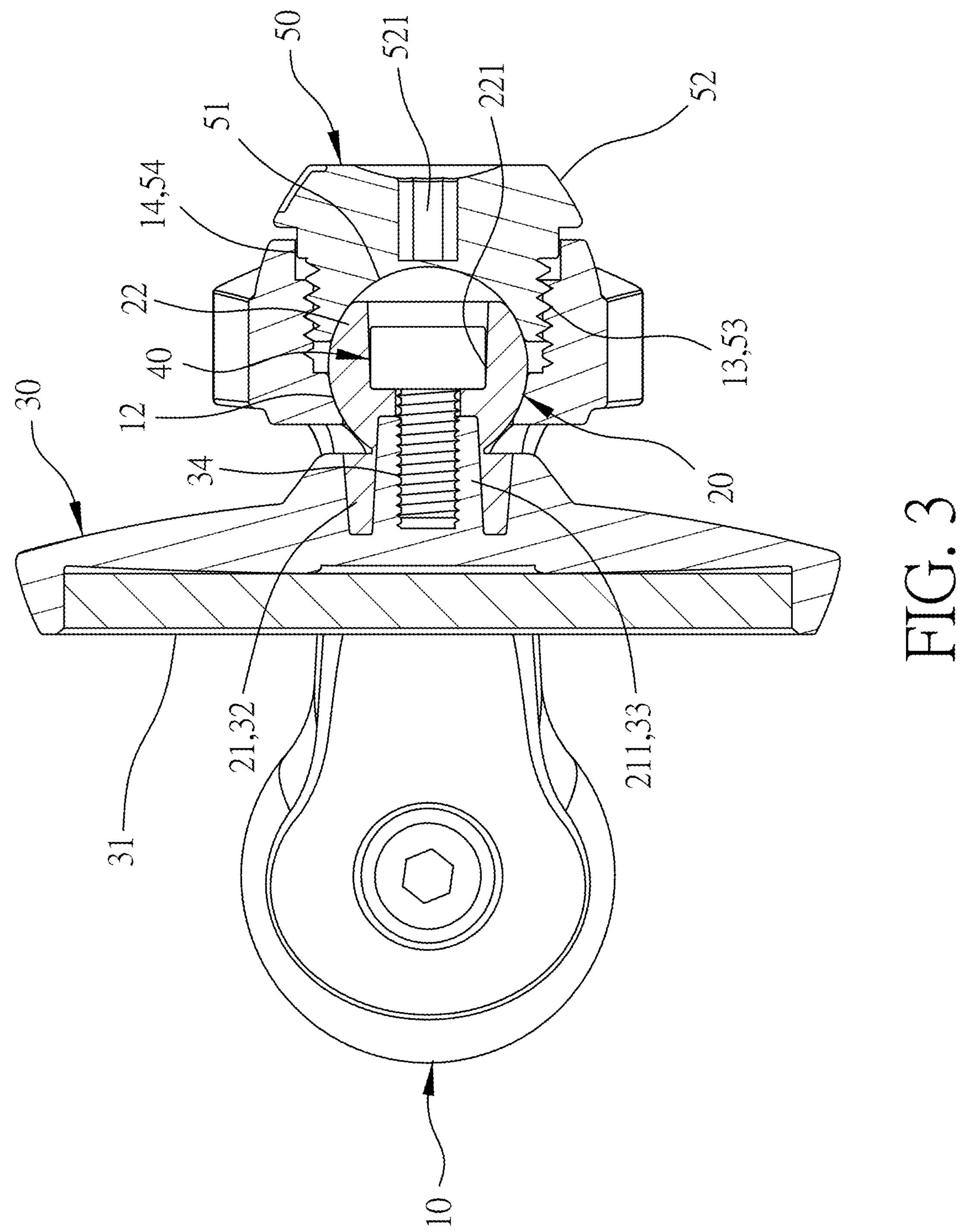
FIG. 3 is a cross-sectional view showing the assembly of the rearview mirror of the vehicle according to the preferred embodiment of the present invention.
Figure 4:
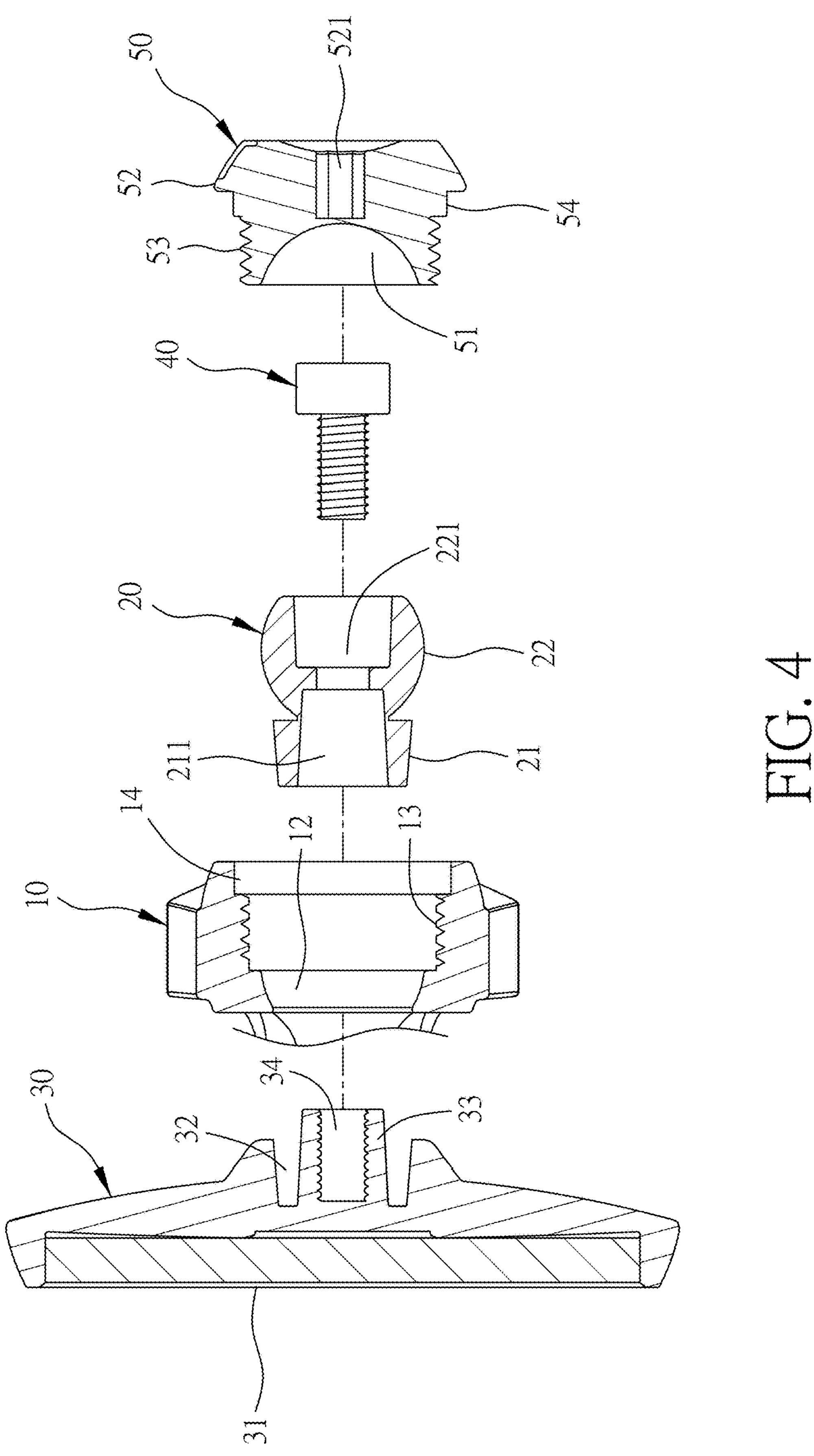
FIG. 4 is a cross-sectional view showing the exploded components of the rearview mirror of the vehicle according to the preferred embodiment of the present invention.
Figure 5:
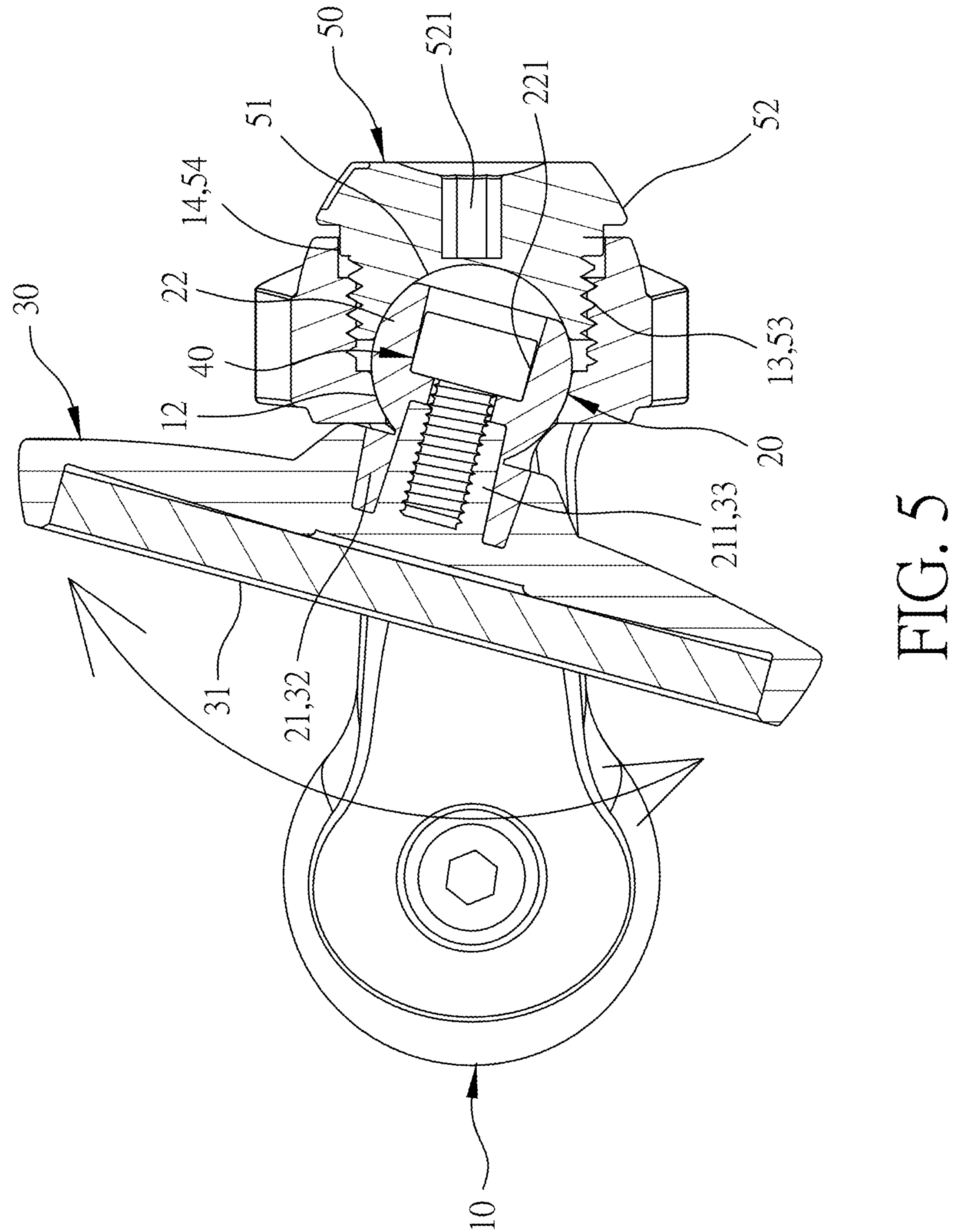
FIG. 5 is a cross-sectional view showing the operation of the rearview mirror of the vehicle according to the preferred embodiment of the present invention.
Figure 6:
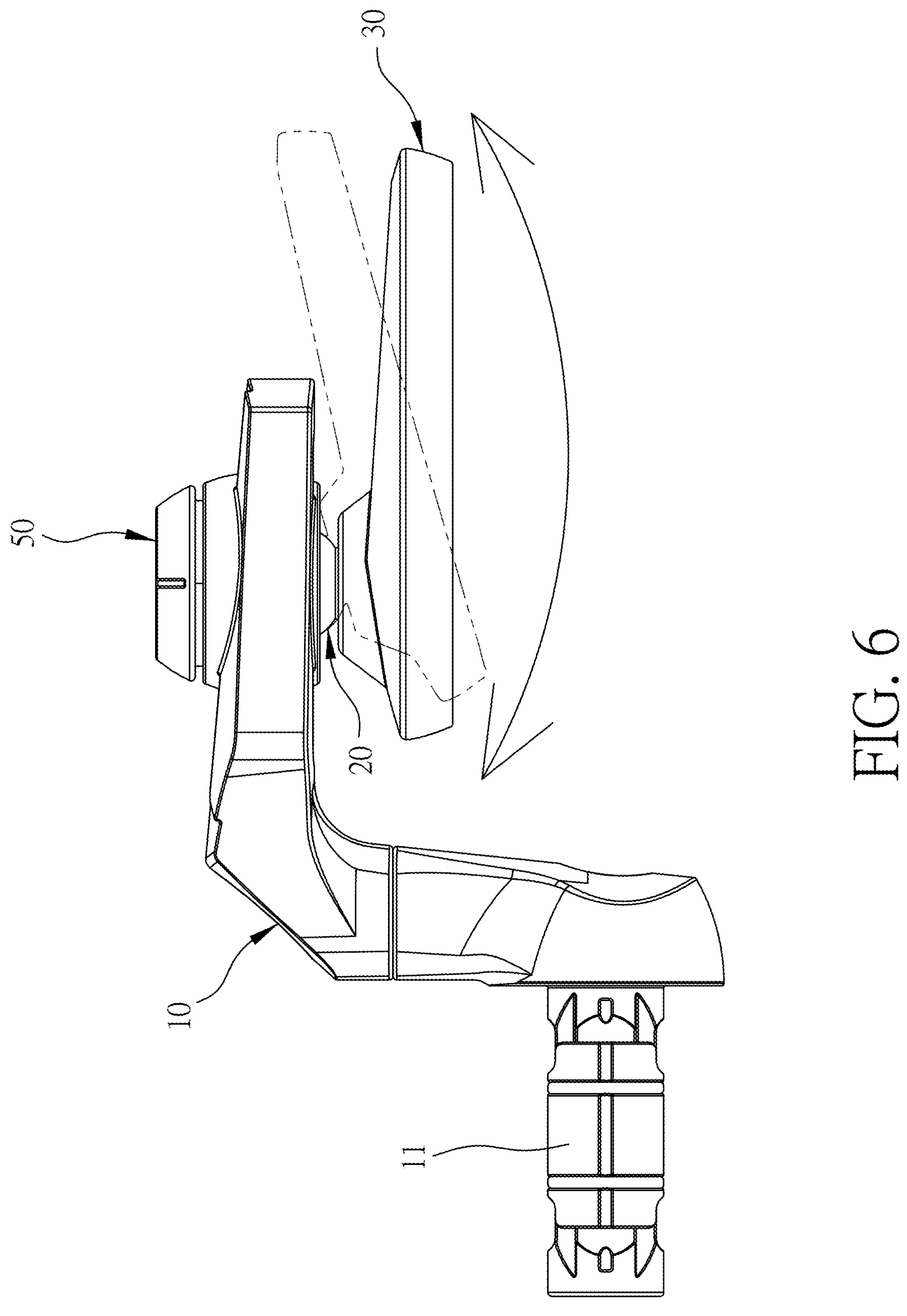
FIG. 6 is a side plan view showing the operation of the rearview mirror of the vehicle according to the preferred embodiment of the present invention.
Figure 7:
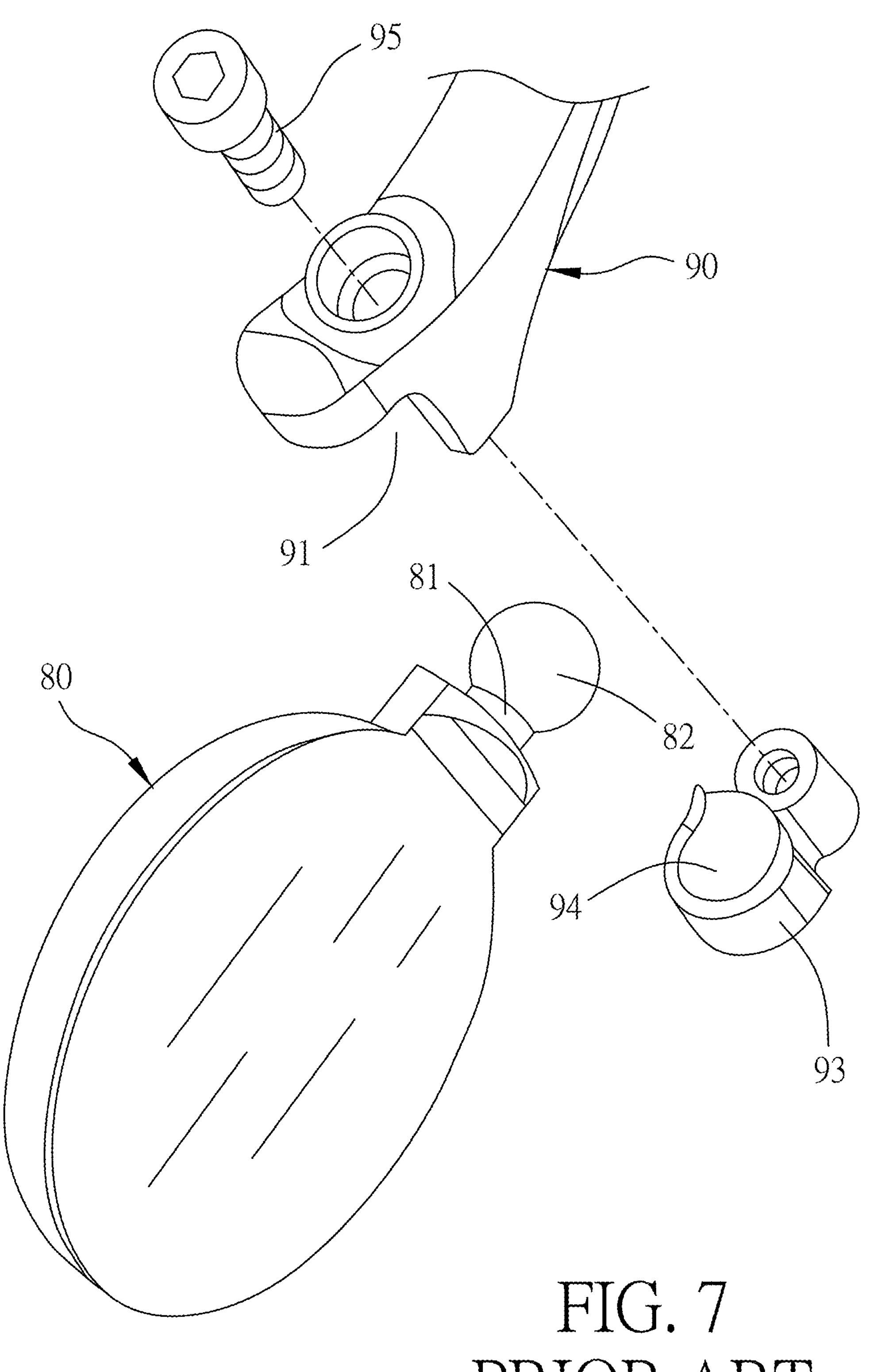
FIG. 7 is a perspective view showing the exploded components of a conventional rearview mirror.
Figure 8:
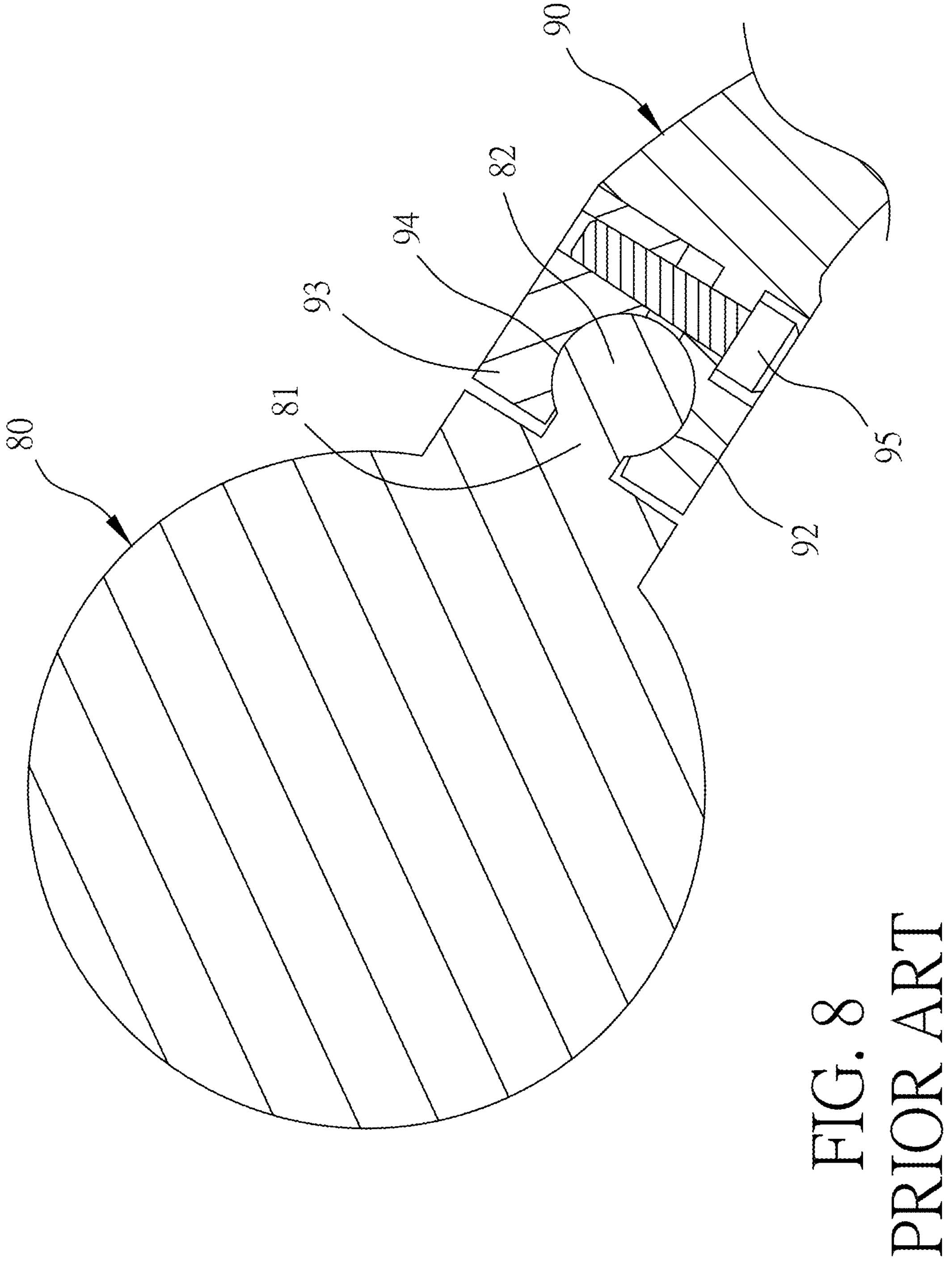
FIG. 8 is a cross-sectional view showing the assembly of the conventional rearview mirror.

With reference to FIGS. 1-4, a rearview mirror of a vehicle according to a preferred embodiment of the present invention comprises a holder 10, a rotatable connector 20, a mirror body 30, a screw 40, and a cap 50.

The holder 10 includes a fixing portion 11 connected on an end thereof, an arcuate groove 12 defined on and communicating with the other end of the holder 10, an internal threaded section 13 formed on an inner wall of the holder 10, and an engagement trench 14, wherein the internal threaded section 13 is defined between the arcuate groove 12 and the engagement trench 14. In this embodiment, the holder 10 is in an L shape, and the fixing portion 11 is a column.

The rotatable connector 20 is made of plastic, and the rotatable connector 20 includes a fitting portion 21 formed in a hexagon shape on an end of the rotatable connector 20, and a universal joint 22 formed in a sphere shape on the other end of the rotatable connector 20, wherein the universal joint 22 is fitted on the arcuate groove 12 of the holder 10, the fitting portion 21 extends out of the arcuate groove 12 and has a receiving orifice 211 extending to the universal joint 22, and the universal joint 22 has a defining orifice 221 extending to the fitting portion 21 and communicating with the receiving orifice 211.

The mirror body 30 includes a reflective mirror 31 formed on a front end thereof, a coupling groove 32 defined on an eccentric portion of a back end of the mirror body 30, a connection post 33 received in the coupling groove 32, and a screwing orifice 34 defined in the connection post 33, wherein the coupling groove 32 is configured to accommodate the fitting portion 21 of the rotatable connector 20, and the connection post 33 is fitted with the receiving orifice 211 of the rotatable connector 20.

The screw 40 is made of metal and is inserted through the defining orifice 221 of the rotatable connector 20 to screw with the screwing orifice 34 of the mirror body 30.

The cap 50 includes an abutting portion 51 formed on an end thereof, an expanded head 52 formed on the other end of the cap 50, an external threaded section 53 formed on an outer wall of the cap 50, and a fastening portion 54 formed on the outer wall of the cap 50 proximate to the expanded head 52, wherein the external threaded section 53 is screwed with the internal threaded section 13 of the holder 10 so that the universal joint 22 of the rotatable connector 20 is rotatably clamped between the arcuate groove 12 of the holder 10 and the abutting portion 51 of the cap 50, the fastening portion 54 of the cap 50 is engaged in the engagement trench 14 of the holder 10, and the expanded head 52 is configured to cover the engagement trench 14 of the holder 10, wherein the expanded head 52 has a rotary operation portion 521 formed thereon. In this embodiment, the abutting portion 51 is a spherical notch, and the rotary operation portion 521 is an internally hexagonal recess.

When connecting the rearview mirror to the vehicle (such as a bicycle or a motorcycle), the fixing portion 11 of the holder 10 is inserted into a handlebar of the vehicle so that the mirror body 30 is located beside the handlebar of the vehicle, and the mirror body 30 is not shielded by a driver so as to obtain a clear view, hence the driver is capable of viewing the reflective mirror 31 of the mirror body 30 directly or from the corner of his/her eye to enhance driving safety and reduce incidence of accidents. When a viewing angle of the reflective mirror 31 is not clear, the mirror body 30 is rotatably clamped between the arcuate groove 12 of the holder 10 and the abutting portion 51 of the cap 50 by using the universal joint 22 of the rotatable connector 20, so the mirror body 30 is rotatable universally along the universal joint 22 of the rotatable connector 20 to adjust an elevation angle or a rotation angle of the mirror body 30, thus obtaining a clear viewing angle of the reflective mirror 31 to avoid a visual blind spot and to enhance the driving safety.

Thereby, the rearview mirror of the vehicle has advantages as follows:

1. The rotatable connector 20 of the rearview mirror is an independent component, for example, the rotatable connector 20 and the mirror body 30 are molded separately, so the rotatable connector 20 is injection molded easily and the fabrication cost of the rear mirror is quite low.
2. The rotatable connector 20 of the rearview mirror is screwed with the mirror body 30 by using the screw 40 to reinforce a structure of the rotatable connector 20, avoid a fracture of the rotatable connector 20, and enhance durability and service life.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A rearview mirror of a vehicle comprising:

a holder including a fixing portion connected to an end of a mirror body, an arcuate groove and an internal threaded section formed on and communicating with the other end of the holder;

a rotatable connector including a fitting portion formed on an end of the rotatable connector, and a universal joint formed in a sphere shape on the other end of the rotatable connector, wherein the universal joint is fitted on the arcuate groove, the fitting portion extends out of the arcuate groove and has a receiving orifice extending to the universal joint, and the universal joint has a defining orifice extending to the fitting portion and communicating with the receiving orifice;

the mirror body including a reflective mirror formed on a front end thereof, a connection post received in a back end of the mirror body, and a screwing orifice defined in the connection post, wherein the connection post is fitted with the receiving orifice of the rotatable connector;

a screw inserted through the defining orifice of the rotatable connector to screw with the screwing orifice of the mirror body; and a cap including an abutting portion formed on an end of the cap, and an external threaded section formed on an outer wall of the cap, wherein the external threaded section is screwed with the internal threaded section of the holder so that the universal joint of the rotatable connector is rotatably clamped between the arcuate groove of the holder and the abutting portion of the cap.

2. The rearview mirror of the vehicle as claimed in claim 1, wherein the holder includes an internal threaded section formed on an inner wall thereof, and the internal threaded section is defined between the arcuate groove and the engagement trench; the cap includes an expanded head formed on the other end thereof, and a fastening portion formed on the outer wall of the cap proximate to the expanded head, wherein the fastening portion of the cap is engaged in the engagement trench of the holder, and the expanded head is configured to cover the engagement trench of the holder.

3. The rearview mirror of the vehicle as claimed in claim 2, wherein the expanded head has a rotary operation portion formed thereon.

4. The rearview mirror of the vehicle as claimed in claim 3, wherein the rotary operation portion is an internally hexagonal recess.

5. The rearview mirror of the vehicle as claimed in claim 1, wherein the holder is in an L shape.

6. The rearview mirror of the vehicle as claimed in claim 1, wherein the mirror body includes a coupling groove defined on a back end of the mirror body around the connection post, and the coupling groove is configured to accommodate the fitting portion of the rotatable connector.

7. The rearview mirror of the vehicle as claimed in claim 6, wherein the fitting portion of the rotatable connector and the coupling groove of the mirror body are hexagonal.

8. The rearview mirror of the vehicle as claimed in claim 6, wherein the coupling groove is defined on an eccentric portion of the back end of the mirror body.

9. The rearview mirror of the vehicle as claimed in claim 1, wherein the fixing portion is a column.

10. The rearview mirror of the vehicle as claimed in claim 1, wherein the abutting portion of the cap is a spherical notch.

* * * * *